US008682369B2

(12) United States Patent
Yang

(10) Patent No.: US 8,682,369 B2
(45) Date of Patent: Mar. 25, 2014

(54) METHOD AND DEVICE FOR IMPLEMENTING UPLINK SYNCHRONIZATION

(75) Inventor: Tao Yang, Shanghai (CN)

(73) Assignee: Alcatel Lucent, Paris (FR)

( * ) Notice: Subject to any disclaimer, the term of this patent is extended or adjusted under 35 U.S.C. 154(b) by 222 days.

(21) Appl. No.: 13/379,800

(22) PCT Filed: Jun. 22, 2009

(86) PCT No.: PCT/CN2009/000687
§ 371 (c)(1),
(2), (4) Date: Dec. 21, 2011

(87) PCT Pub. No.: WO2010/148532
PCT Pub. Date: Dec. 29, 2010

(65) Prior Publication Data
US 2012/0149428 A1    Jun. 14, 2012

(51) Int. Cl.
*H04B 7/00* (2006.01)
*H04B 15/00* (2006.01)

(52) U.S. Cl.
USPC ...... 455/502; 455/67.11; 455/501; 455/67.16

(58) Field of Classification Search
USPC .......... 455/434, 422.1, 452.1, 13.2, 500, 501, 455/502, 517, 524, 67.13, 67.11, 67.16; 370/350, 315, 326, 329, 331
See application file for complete search history.

(56) References Cited

U.S. PATENT DOCUMENTS

| 2003/0076812 A1* | 4/2003 | Benedittis ...................... 370/350 |
| 2009/0161599 A1* | 6/2009 | Haartsen et al. .............. 370/326 |
| 2009/0290555 A1* | 11/2009 | Alpert et al. .................. 370/331 |
| 2009/0316642 A1* | 12/2009 | Yamada et al. ............... 370/329 |

FOREIGN PATENT DOCUMENTS

| CN | 1452821 A | 10/2003 |
| CN | 101064561 A | 10/2007 |
| WO | WO2008084967 A1 | 7/2008 |

OTHER PUBLICATIONS

International Search Report for PCT/CN2009/000687 dated Apr. 1, 2010.

* cited by examiner

*Primary Examiner* — John J Lee
(74) *Attorney, Agent, or Firm* — Fay Sharpe LLP

(57) ABSTRACT

Embodiments of the invention provide a method and device for establishing uplink (UL) synchronization. The method includes: instructing a UE to perform a dedicated PRACH transmission; calculating a timing advance (TA) according to first timing information derived by itself and second timing information received from a plurality of non-serving base stations, and sending the timing advance to the UE to enable the UE to establish the uplink synchronization with involved base stations according to the timing advance, wherein the first timing information and the second timing information are associated with propagation delays of the dedicated PRACH transmission performed by the UE. With the above solution, it may be easy to establish UL synchronization between the UE and all involved base stations for UL CoMP.

13 Claims, 5 Drawing Sheets

METHOD AND DEVICE FOR IMPLEMENTING UPLINK SYNCHRONIZATION

FIELD OF THE INVENTION

The present invention relates to wireless communication technology, and more particularly to a method and device for implementing uplink synchronization.

BACKGROUND OF THE INVENTION

Uplink (UL) Coordinated Multiple Points (CoMP) has been accepted in 36.814 as an important candidate for enhancing UL capacity in an LTE-advanced system. For UL CoMP, more than one base stations (BSs) are configured to receive the UL transmission from a UE and the received signals are combined to get combining gain. The most important baseline for implementation of UL CoMP is that all involved base stations must be able to receive the UL transmissions from a UE, that is, the UE should perform UL synchronization with all involved base stations prior to the UL transmission so as to solve the different propagation delays between UE and involved base stations. For example, as shown in FIG. 6, this issue due to the difference between the propagation delays t1 and t2 for the involved base stations BS1 and BS2 must be resolved if UL CoMP is to be performed.

In general speaking, UL synchronization means that UE's transmission arrives at involved base stations within their Cyclic Prefix (CP)'s coverage; otherwise, if the UL transmission arrives at a base station before or late to its CP's coverage, the impacted base station may not decode this UL transmission correctly, hence the UL CoMP may not be achieved. In this case a feasible solution is provided to solve this problem. To guarantee UE's UL transmission arriving at the base station during its CP's coverage, a straightforward way is to design a longer CP to eliminate the impact of different propagation delays. As shown in FIG. 7, in FIG. 7, it is clear that the UL transmission to both BS1 and BS2 are in the CP's coverage. However, this solution has the following drawbacks:

1. It is very hard to determine an optimal CP length to cover different UL CoMP scenarios. For example, for scenarios where propagation delays to the involved base stations are similar, a small CP length is enough, however, it is not applicable to scenarios where the propagation delays varied dramatically. Also the longer CP will result in resource waste for scenarios with similar propagation delays.

2. This longer CP results in large overhead and leads to UL capacity loss. The reason is that the symbols which should be used to send data are now occupied by extended CP.

3. This solution may not support legacy UEs.

4. Scheduling flexibility is restricted since the UL CoMP may only be scheduled in the frame with longer CP length.

SUMMARY OF THE INVENTION

Embodiments of the present invention propose a method and system for establishing UL synchronization in order to solve the above issues.

According to an aspect of the present invention, a method for establishing uplink synchronization is provided. The method includes: instructing a UE to perform a dedicated PRACH transmission; and calculating a timing advance (TA) according to first timing information derived by itself and second timing information received from a plurality of non-serving base stations, and sending the timing advance to the UE to enable the UE to establish the uplink synchronization with involved base stations according to the timing advance, wherein the first timing information and the second timing information are associated with propagation delays of the dedicated PRACH transmission performed by the UE.

According to another aspect of the present invention, it is provided a base station including: a trigger unit configured to instruct a UE to perform a dedicated PRACH transmission; a base stations transceiver unit configured to send the instruction from the trigger unit to the UE; a propagation delay estimating unit configured to estimate a propagation delay based on detection of the dedicated PRACH transmission performed by the UE, so as to derive first timing information; and a TA calculating unit configured to calculate the timing advance (TA) according to the first timing information and second timing information received by the transceiver unit (220) from a plurality of non-serving base stations, and to send the timing advance to the UE through the base station transceiver unit, wherein the first timing information and the second timing information are associated with propagation delays of the dedicated PRACH transmission performed by the UE.

According to another aspect of the present invention, it is provided a base station including: a detecting unit configured to detect a dedicated PRACH transmission from a UE; and a delay estimating unit configured to estimate a propagation delay according to the dedicated PRACH transmission detected by the detecting unit so as to derive timing information, and to send through the detecting unit the timing information to a serving base station of the LIE to calculate a timing advance.

According to another aspect of the present invention, it is provided a User Equipment (UE) including: a UE transceiver unit configured to receive a dedicated PRACH transmission instruction and a TA from the UE's serving base stations, wherein the TA is a timing advance calculated by the UE's serving base station according to both timing information of a propagation delay of the dedicated PRACH transmission performed by the UE derived by the UE's serving base station itself and timing information of propagation delays of the dedicated PRACH transmission performed by the UE received from the other base stations; a PRACH transmitting unit configured to perform the dedicated PRACH transmission according the received dedicated PRACH transmission instruction; and a UL transmitting unit configured to perform uplink transmission according to the received TA.

According to another aspect of the present invention, it is provided a communication system comprising the above base stations and user equipment.

Based on the above solution, it's advantage lines in that it's easy to establish a synchronization between the UE and all involved base stations for the UL CoMP; backward compatibility is supported without making any modification to the UE's software, hardware or protocol; and there is no impact on capacity and scheduling flexibility since it does not need to extend CP.

BRIEF DESCRIPTION OF THE DRAWINGS

The advantages of the present invention will become more apparent from following detailed description in conjunction with the accompanying drawings, wherein.

DETAILED DESCRIPTION OF THE INVENTION

Preferred embodiments of the present invention will now be explained in detail with reference to the accompanying drawings. Details and functions that are not necessary for the present invention are omitted in the description so as not to obscure the understanding of the present invention.

Figure 1:
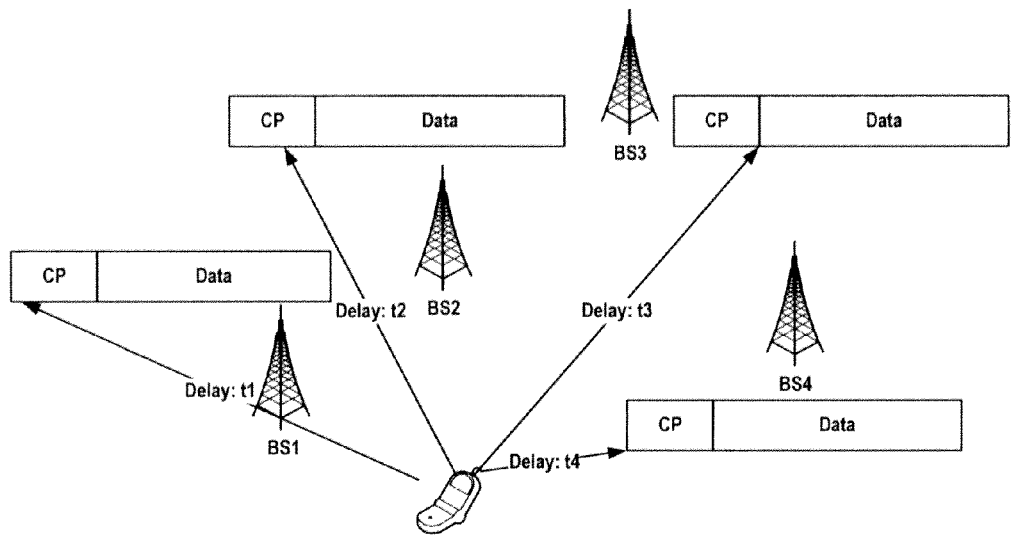
FIG. 1 illustrates a schematic drawing of a system for UL CoMP according to an embodiment of the present invention.

In an embodiment of the present invention, a system for uplink synchronization is proposed as shown in FIG. 1, which includes the following base stations and User Equipment (UE).

Figure 2:
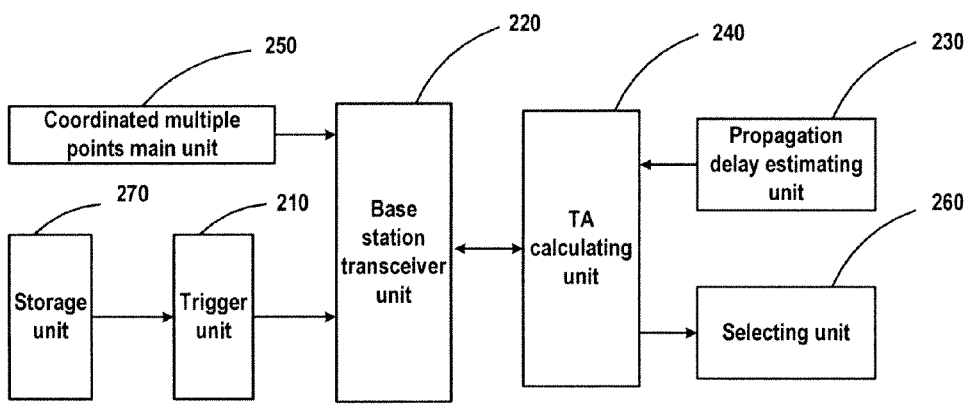
FIG. 2 illustrates a block diagram of a serving base station for UL CoMP according to an embodiment of the present invention.

Also, a base station as shown in FIG. 2 is proposed, which includes a trigger unit 210 configured to instruct a UE to perform a dedicated Physical Random Access Channel (PRACH) transmission; a base station transceiver unit 220 configured to send the instruction from the trigger unit to the UE; a propagation delay estimating unit 230 configured to estimate the propagation delay based on detection of the dedicated PRACH transmission performed by the UE, so as to derive first timing information; a timing advance (TA) calculating unit 240 configured to calculate the timing advance according to the first timing information and second timing information received by the transceiver unit 220 from a plurality of non-serving base stations (NSBS), and to send the timing advance to the UE through the base station transceiver unit 220, wherein the first timing information and the second timing information are associated with propagation delays of the dedicated PRACH transmission performed by the UE.

The base station further includes a coordinated multiple points main unit 250 configured to receive, through the base stations transceiver unit 220, the uplink transmission directly from the UE and the uplink transmissions forwarded by the plurality of non-serving base stations and performed by the UE according to the established uplink synchronization, and to combine the uplink transmission directly from the UE and the uplink transmissions forwarded the plurality of non-serving base stations so as to perform CoMP transmission.

The base station further includes a selecting unit 260 configured to, when the plurality of non-serving base stations includes a non-serving base station that makes it unable to generate the timing advance for establishing the uplink synchronization, exclude the second timing information of that non-serving base station. The TA calculating unit is further configured to recalculate the timing advance according to the first timing information and the second timing information provided by remaining non-serving base stations left in the plurality of non-serving base stations after the exclusion.

The base station further includes a storage unit 270 configured to store dedicated PRACH random access codes. The trigger unit 210 is further configured to select an unused dedicated PRACH random access code from the storage unit 270 and send it to the UE through the base station transceiver unit 220 to request the UE to perform the dedicated PRACH transmission based on the unused dedicated PRACH random access code. The trigger unit 210 is further configured to notify the selected unused dedicated PRACH random access code to the plurality of non-serving base stations through the base station transceiver unit 220.

Figure 3:
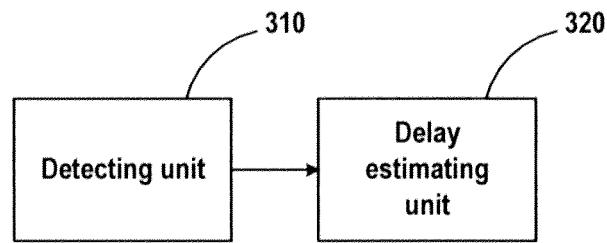
FIG. 3 illustrates a block diagram of a non-serving base station for UL CoMP according to an embodiment of the present invention.

Also, a base station as shown in FIG. 3 is proposed, which includes a detecting unit 310 configured to detect a dedicated PRACH transmission from a UE; and a delay estimating unit 320 configured to estimate a propagation delay according to the dedicated PRACH transmission detected by the detecting unit 310 so as to derive timing information, and to send through the detecting unit 310 the timing information to a serving base station of the UE to calculate the timing advance.

Furthermore, the detecting unit 310 is further configured to receive information of a first dedicated random access code from the serving base station. If the detected dedicated PRACH transmission includes a second dedicated random access code identical to the first dedicated random access code, the delay estimating unit 320 is further configured to estimate the propagation delay of the detected dedicated PRACH transmission so as to derive the timing information.

The detecting unit 310 is further configured to detect the uplink transmission performed by the UE after the uplink synchronization is established according the timing advance, and to forward the detected uplink transmission to the serving base station of the UE to perform CoMP transmission.

Figure 4:
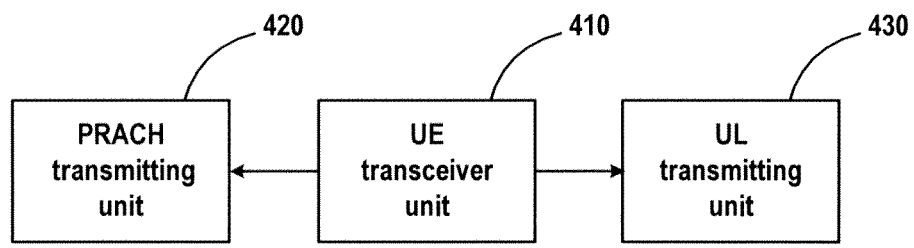
FIG. 4 illustrates a block diagram of a UE for UL CoMP according to an embodiment of the present invention.

Also, a User Equipment (UE) as shown in FIG. 4 is proposed, which includes a UE transceiver unit 410 configured to receive a dedicated PRACH transmission instruction and a TA from the UE's serving base station, wherein the TA is a timing advance calculated by the UE's serving base station according to both the timing information of the propagation delay of the dedicated PRACH transmission performed by the UE derived by the UE's serving base station itself and the timing information of the propagation delays of the dedicated PRACH transmission performed by the UE received from the other base stations; a PRACH transmitting unit 420 configured to perform the dedicated PRACH transmission according the received dedicated PRACH transmission instruction; and a UL transmitting unit 430 configured to perform UL transmission according to the received TA.

Although the base station and UE in embodiments of the invention are described by means of separate functional modules, in actual applications respective component shown in FIGS. 2-4 may be implemented by a plurality of devices and in actual applications a plurality of components shown in the accompanying figures may be integrated into a single chip or a single equipment. The base station and the UE may further include any other units and means for other purposes.

Figure 5:
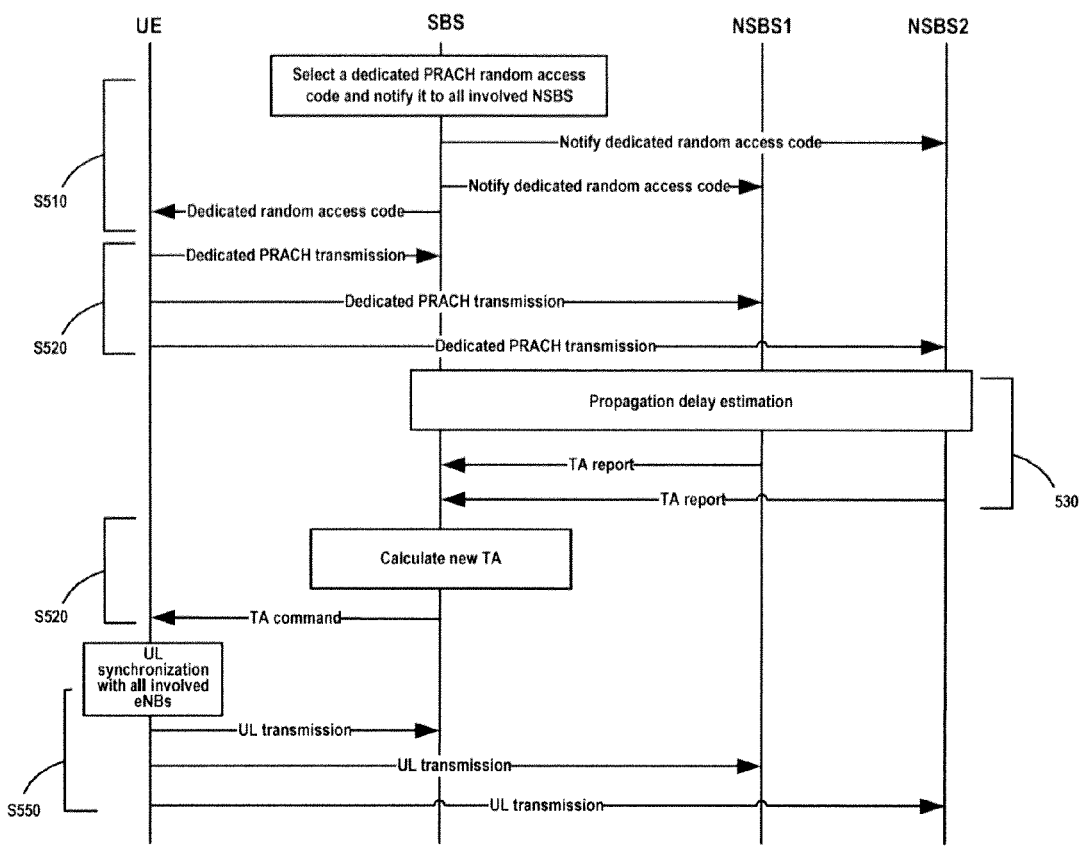
FIG. 5 illustrates a flow diagram of a method for UL CoMP according to an embodiment of the present invention.
Figure 6:
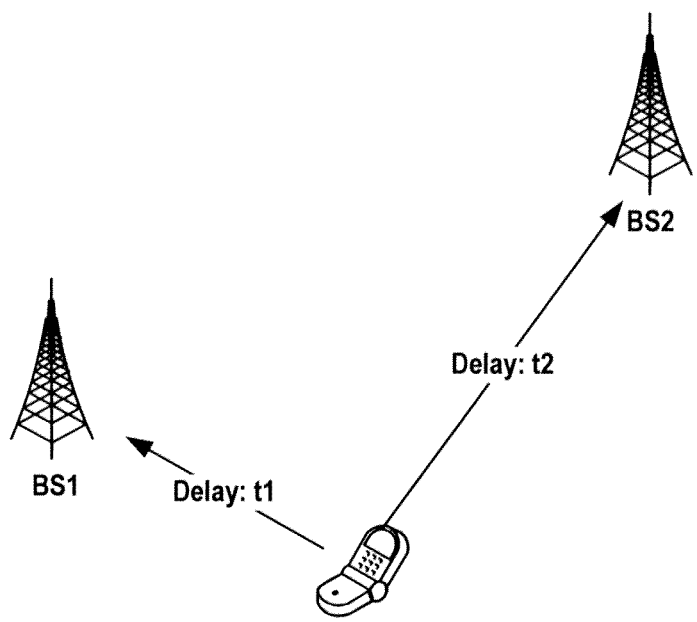
FIG. 6 illustrates a schematic drawing of propagation delays between a UE and different base stations.
Figure 7:
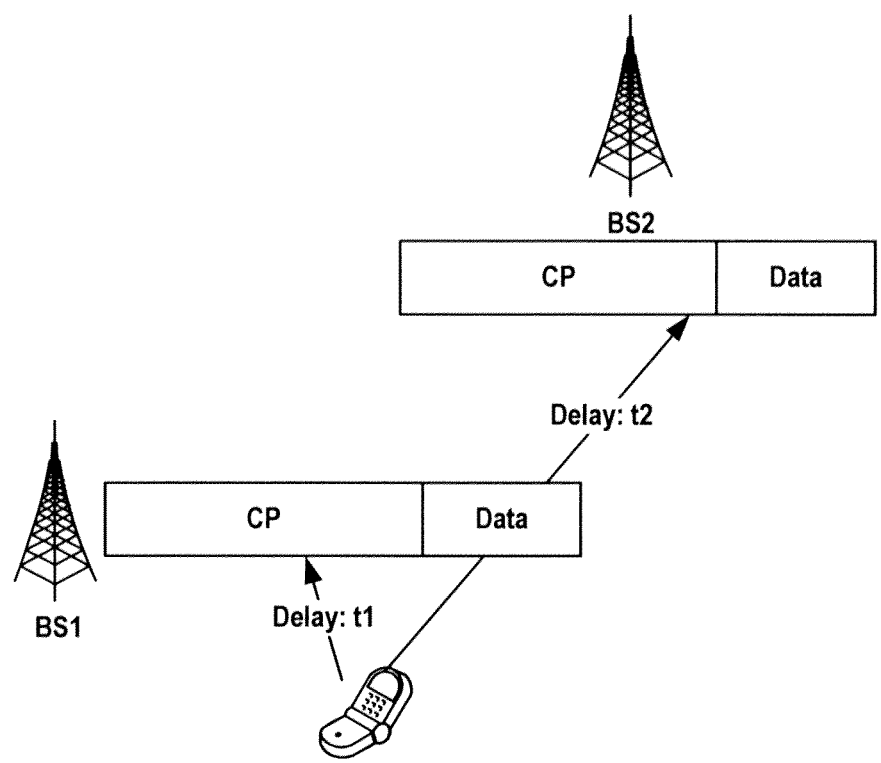
FIG. 7 illustrates a schematic drawing of a scheme to deal with different propagation delays in the prior art.

The specific structures and operation processes of the above described base station and user equipment (UE, for example) will now be described in detail in conjunction with FIG. 5. For a UL CoMP scenario, an embodiment of the invention employs a contention-free PRACH transmission strategy. The specific steps are shown in FIG. 5.

In step S510, the trigger unit 210 of a Serving Base Station (SBS) selects an unused dedicated random access code from its dedicated RACH preamble pool and notifies it to all involved non-serving base stations through the base station transceiver unit 220. The serving base station also requests the UE to perform a dedicated FRACH transmission based the selected dedicated random synchronization code.

In step S520, the PRACH transmitting unit 420 of the UE performs the dedicated PRACH transmission accordingly.

In step S530, the detecting unit 310 of a non-serving base station detects the dedicated PRACH transmission, and the delay estimating unit 320 estimates a propagation delay according to the detected dedicated PRACH transmission. At the same time, the propagation delay estimating unit 230 of the serving base station estimates a propagation delay according to the dedicated PRACH transmission detected by the base station transceiver unit 220. When the dedicated PRACH random access code received from the UE by the non-serving base station is identical to that received from the serving base station, the non-serving base station reports the estimated timing information of the propagation delay through the transmitting unit 420.

In step S540, the TA calculating unit 240 of the serving base station determines a new TA command according to timing information it received (i.e. second timing information) and timing information estimated by its propagation delay estimating unit 230 (i.e. first timing information) so as to guarantee that the timings within which the UL transmission arrives at the involved base stations are covered by the base station's CP. Then the serving base station delivers a TA command to the UE through the base station transceiver unit 220.

In step S550, the UL transmitting unit 430 of the UE uses the TA command received by the UE transceiver unit to perform the UL synchronization of all involved base stations.

After the UL synchronization is established, the UE may initiate a UL transmission. The UL transmission is forwarded to a serving base station if the detecting unit 310 of a non-serving base station detects it. The serving base station receives the UL transmission from the UE and the UL transmissions forwarded by the non-serving base stations through the base station transceiver unit 220 and combines them by the coordinated multiple points unit 250.

The solution provided by embodiments of the invention may also be used to determine whether a UE is able to employ the UL CoMP technology. For example, if the serving station may not find a TA command that may guarantee UL transmissions to arrive at the base station within the shortest/longest propagation delay of the CP's coverage, the UE may not employ UL CoMP since there are base stations that cannot receive the UE's UL transmission. Otherwise, from another point of view, the solution may choose an appropriate base station to provide service for the UE. For example, the selecting unit 260 of the serving base station may select the base stations whose CP may cover the UE's UL transmission and put into the UE's UL CoMP set.

With respect to the UL CoMP implementation in embodiments of the invention, the baseline is that the UE establishes the UL synchronization to all involved base stations. The all involved base stations measure their propagation delays to the UE and exchange information of the propagation delays to generate a predefined timing advance command so that UL transmissions of the UE are all covered by their CP, as shown in FIG. 1. In FIG. 1 assumed that t4 is the shortest propagation delay while t3 is the longest one. Then a TA command may be determined to guarantee the UL transmission arrivals at BS4 and BS3 in CP's coverage. For example, the UL transmission arrives at BS4 at the beginning of the CP and arrives at BS3 at the end of the CP. It is apparent that the UL transmission will also arrives at BS1 and BS2 in the CP's coverage. Therefore, the UL synchronization between UE and all involved BSs is established.

In the above described solution, from UE's point of view, what the UE needs to do is to perform the dedicated PRACH transmission and adopt a new TA command to perform the UL transmission when it receives the new TA command. Compared with general UE operation in LTE, it does not need any modification to the protocols or softwares. From this point, backward compatibility is supported by the solution proposed by the invention. Furthermore, since normal CP length is adopted, it does not result in any additional overhead or any impact on UL capacity.

Those skilled in the art would readily appreciate that various steps of the above methods may be performed by programmed computers. Herein, some embodiments may involve machine readable or computer readable program storage devices, e.g., digital data storage media, and encoded program instructions executable by machine or computer, wherein said instructions perform some or all of the steps of the above methods. The program storage devices may be, for example, digital memories, magnetic storage media such as magnetic disks and magnetic tapes, hard drives, or optically readable digital data storage media. The embodiments also intends to cover computers programmed to perform steps of the above methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for teaching purposes to help the readers understanding the principles of the invention and the concepts contributed by the inventors to furthering the art, and are to be construed as being not limitations to such specifically recited examples and conditions. Moreover, all statements herein reciting principles, aspects, and embodiments of the invention, as well as specific examples thereof, are intended to encompass equivalents thereof.

The above description only serves as embodiments for implementing the invention, it may be understood by those skilled in the art that any modifications or local substitutions without departing from the scope of the invention are within the scope of the invention defined by the claims. Therefore, the protection scope of the invention is accorded to the protection scope of the claims.

What is claimed is:

1. A method for establishing uplink synchronization comprising:
    instructing a User Equipment (UE) to perform a dedicated Physical Random Access Channel (PRACH) transmission; and
    calculating a timing advance (TA) according to first timing information derived by itself and second timing information received from a plurality of non-serving base stations, and sending the timing advance to the UE to enable the UE to establish the uplink synchronization with involved base stations according to the timing advance, wherein the first timing information and the second timing information are associated with propagation delays of the dedicated PRACH transmission performed by the UE.

2. The method of claim 1, further comprising:
    receiving uplink transmissions received by the plurality of non-serving base stations and performed by the UE according to the established uplink synchronization; and
    combining the received uplink transmissions and the UE's uplink transmission received by itself to perform Coordinated Multiple Points (CoMP) transmission.

3. The method of claim 1, wherein instructing the UE to perform the dedicated PRACH transmission comprises:
    selecting an unused dedicated PRACH random access code from its dedicated RACH preamble pool and sending it to the UE to request the UE to perform the dedicated PRACH transmission based the unused dedicated PRACH random access code; and notifying the selected unused dedicated PRACH random access code to the plurality of non-serving base stations.

4. The method of claim 3, wherein calculating the timing advance (TA) according to the first timing information derived by itself and the second timing information received from the plurality of non-serving base stations comprises:
estimating the propagation delay based on detection of the dedicated PRACH transmission performed by the UE so as to derive the first timing information; and
calculating the timing advance according to the estimated first timing information and the second timing information received from the plurality of non-serving base stations, wherein the second timing information is reported by the plurality of non-serving base stations to a serving station when the dedicated PRACH random access code received by the plurality of non-serving base stations from the UE is identical to the dedicated PRACH random access code received from the serving station.

5. The method of claim 1, wherein when the plurality of non-serving base stations include a non-serving base station that makes it unable to generate the timing advance for establishing the uplink synchronization, the second timing information provided by that non-serving base station is excluded; and
the timing advance is recalculated according to the first timing information and the second timing information provided by remaining non-serving base stations left in the plurality of non-serving base stations after the exclusion.

6. A base station comprising:
a trigger unit configured to instruct a User Equipment (UE) to perform a dedicated Physical Random Access Channel (PRACH) transmission;
a base stations transceiver unit configured to send the instruction from the trigger unit to the UE;
a propagation delay estimating unit configured to estimate a propagation delay based on detection of the dedicated PRACH transmission performed by the UE, so as to derive first timing information; and
a timing advance (TA) calculating unit configured to calculate the timing advance (TA) according to the first timing information and second timing information received by the transceiver unit from a plurality of non-serving base stations, and to send the timing advance to the UE through the base station transceiver unit, wherein the first timing information and the second timing information are associated with propagation delays of the dedicated PRACH transmission performed by the UE.

7. The base station of claim 6, further comprising a storage unit configured to store dedicated PRACH random access codes; and
wherein the trigger unit is further configured to select an unused dedicated PRACH random access code from the storage unit and send it to the UE through the base station transceiver unit to request the UE to perform the dedicated PRACH transmission based on the unused dedicated PRACH random access code, and the trigger unit is further configured to notify the selected unused dedicated PRACH random access code to the plurality of non-serving base stations through the base station transceiver unit.

8. The base station of claim 6, further comprising a coordinated multiple points unit configured to receive through the base stations transceiver unit uplink transmission directly from the UE and uplink transmissions forwarded by the plurality of non-serving base stations and performed by the UE according to the established uplink synchronization, and to combine the uplink transmission directly from the UE and the uplink transmissions forwarded by the plurality of non-serving base stations so as to perform Coordinated Multiple Points (CoMP) transmission.

9. The base station of claim 6, further comprising a selecting unit configured to, when the plurality of non-serving base stations includes a non-serving base station that makes it unable to generate the timing advance for establishing the uplink synchronization, exclude the second timing information of that non-serving base station; and
wherein the TA calculating unit is further configured to recalculate the timing advance according to the first timing information and the second timing information provided by remaining non-serving base stations left in the plurality of non-serving base stations after the exclusion.

10. A base station comprising:
a detecting unit configured to detect a dedicated Physical Random Access Channel (PRACH) transmission from a User Equipment (UE); and
a delay estimating unit configured to estimate a propagation delay according to the dedicated PRACH transmission detected by the detecting unit so as to derive timing information, and to send through the detecting unit the timing information to a serving base station of the UE to calculate a timing advance;
wherein the detecting unit is further configured to receive information of a first dedicated random access code from the serving base station, and the delay estimating unit is further configured to estimate the propagation delay of the detected dedicated PRACH transmission so as to derive the timing information if the detected dedicated PRACH transmission includes a second dedicated random access code identical to the first dedicated random access code.

11. The base station of claim 10, wherein the detecting unit is further configured to detect an uplink transmission performed by the UE after the uplink synchronization is established according the timing advance, and to forward the detected uplink transmission to the serving base station of the UE to perform Coordinated Multiple Points (CoMP) transmission.

12. A User Equipment (UE) comprising:
a UE transceiver unit configured to receive a dedicated Physical Random Access Channel (PRACH) transmission instruction and a timing advance (TA) from the UE's serving base stations, wherein the TA is a timing advance calculated by the UE's serving base station according to both timing information of a propagation delay of the dedicated PRACH transmission performed by the UE derived by the UE's serving base station itself and timing information of propagation delays of the dedicated PRACH transmission performed by the UE received from the other base stations;
a PRACH transmitting unit configured to perform the dedicated PRACH transmission according the received dedicated PRACH transmission instruction; and
an uplink (UL) transmitting unit configured to perform uplink transmission according to the received TA.

13. A communication system comprising:
a first base station comprising:
a trigger unit configured to instruct a User Equipment (UE) to perform a dedicated Physical Random Access Channel (PRACH) transmission, a base stations transceiver unit configured to send the instruction from the trigger unit to the UE, a propagation delay estimating unit configured to estimate a propagation delay based on detection of the dedicated PRACH transmission performed by the UE, so as to derive first timing information, and a timing advance (TA) calculating unit configured to calculate the timing advance (TA) according to the first timing information and second timing information received by the transceiver unit from a plurality of non-serving base stations, and to send the timing advance to the UE through the base station transceiver unit, wherein the first timing information and the second timing information are associated with propagation delays of the dedicated PRACH transmission performed by the UE;

a second base station comprising:

a detecting unit configured to detect a dedicated Physical Random Access Channel (PRACH) transmission from a User Equipment (UE), and a delay estimating unit configured to estimate a propagation delay according to the dedicated PRACH transmission detected by the detecting unit so as to derive timing information, and to send through the detecting unit the timing information to a serving base station of the UE to calculate a timing advance; and, user equipment (UE) comprising:

a UE transceiver unit configured to receive a dedicated Physical Random Access Channel (PRACH) transmission instruction and a timing advance (TA) from the UE's serving base stations, wherein the TA is a timing advance calculated by the UE's serving base station according to both timing information of a propagation delay of the dedicated PRACH transmission performed by the UE derived by the UE's serving base station itself and timing information of propagation delays of the dedicated PRACH transmission performed by the UE received from the other base stations, a PRACH transmitting unit configured to perform the dedicated PRACH transmission according the received dedicated PRACH transmission instruction, and an uplink (UL) transmitting unit configured to perform uplink transmission according to the received TA.

* * * * *